US008564870B2

(12) United States Patent
Andersson Ersman et al.

(10) Patent No.: US 8,564,870 B2
(45) Date of Patent: Oct. 22, 2013

(54) ACTIVE-MATRIX ELECTROCHROMIC DISPLAY DEVICE AND METHOD FOR PRODUCING THE SAME

(75) Inventors: Peter Andersson Ersman, Finspång (SE); Kazuya Katoh, Tokyo (JP); Jun Kawahara, Norrköping (SE)

(73) Assignees: Acreo AB, Kista (SE); Lintec Corporation, Tokyo (JP)

( * ) Notice: Subject to any disclaimer, the term of this patent is extended or adjusted under 35 U.S.C. 154(b) by 9 days.

(21) Appl. No.: 13/499,986

(22) PCT Filed: Oct. 5, 2010

(86) PCT No.: PCT/EP2010/064820
§ 371 (c)(1),
(2), (4) Date: Apr. 3, 2012

(87) PCT Pub. No.: WO2011/042431
PCT Pub. Date: Apr. 14, 2011

(65) Prior Publication Data
US 2012/0212793 A1    Aug. 23, 2012

Related U.S. Application Data

(60) Provisional application No. 61/272,543, filed on Oct. 5, 2009.

(30) Foreign Application Priority Data

Oct. 5, 2009    (EP) .................................... 09172217

(51) Int. Cl.
*G02F 1/15*    (2006.01)
(52) U.S. Cl.
USPC ........................................................ 359/265

(58) Field of Classification Search
USPC ........................................ 359/265, 273, 274
See application file for complete search history.

(56) References Cited

U.S. PATENT DOCUMENTS

| 4,426,643 A | 1/1984 | Martin |
| 2005/0274986 A1 | 12/2005 | Sirringhaus et al. |

FOREIGN PATENT DOCUMENTS

| JP | 60-217345 | 10/1985 |
| WO | WO-03042753 A1 | 5/2003 |
| WO | WO 2005/027599 | 3/2005 |
| WO | WO 2010/099147 | 9/2010 |

OTHER PUBLICATIONS

Andersson P. et al: "Printable All-Organic Electrochromic Active-Matrix Displays." Advanced Functional Materials, Wiley VCH, Weinheim, DE, vol. 17, No. 16, Nov. 5, 2007 pp. 3074-3082, XP001507483, ISSN: 1616-301X.*
International Search Report, dated Jan. 12, 2011.
International Preliminary Report on Patentablilty, dated Oct. 11, 2011.
Written Opinion dated Dec. 30, 2010.
European Search Report dated Mar. 22, 2010.

* cited by examiner

*Primary Examiner* — Joseph P Martinez
(74) *Attorney, Agent, or Firm* — Harness, Dickey & Pierce, P.L.C.

(57) ABSTRACT

There is disclosed a method for manufacturing a display device arrangement, which includes a plurality of electrochromic pixel devices arranged in a matrix. First a plastic insulating layer is provided comprising passages for electrical conductors. Thereafter, in optional order, electrical conductors are provided in the passages, pixel layers are printed on one side of the insulating layer, and control layers are printed on the other side of the insulating layer. By this method the manufacturing of a printed electrochromic pixel device is improved.

31 Claims, 8 Drawing Sheets

ACTIVE-MATRIX ELECTROCHROMIC DISPLAY DEVICE AND METHOD FOR PRODUCING THE SAME

This application is the national phase under 35 U.S.C. §371 of PCT International Application No. PCT/EP2010/064820 which has an International filing date of Oct. 5, 2010, which claims priority under 35 U.S.C. §119 to European Patent Application No. 09172217.3, filed on Oct. 5, 2009, and claims priority under 35 U.S.C. §119 and/or 120 to U.S. Provisional Application No. 61/272,543, filed on Oct. 5, 2009, the contents of each of which are hereby incorporated herein by reference in their entirety.

FIELD OF THE INVENTION

The present invention relates to electrochemically active organic pixel devices and in particular to printable, electrochemically active pixel devices based on electrochromic materials.

BACKGROUND ART

An electrochemical pixel device based on an organic and electrochemically active material is described, e.g. by P. Andersson et al., in "Printable All-Organic Electrochromic Active-Matrix Displays", Advanced Functional Materials, volume 17, number 16, pp. 3074-3082 (2007). The pixel device is formed by combining an electrochemical transistor with an electrochromic display cell in a side by side arrangement. Furthermore, the electrochemical transistor and the electrochromic display cell are formed of the same organic and electrochemically active material, which, in combination with the side by side arrangement, make possible a display that is very cost effective and simple to manufacture e.g. in a roll-to-roll production procedure. Also, the cost and the complexity of the manufacturing process are reduced due to that only a low number of printing steps and a low number of materials are required.

A drawback of the described display device relates to the electrochemical transistor. Since the electrochemical transistor elements change colour during the switching operation associated with the control of each pixel device, as a result, the perception of a display formed of a number of pixel devices may be disturbed by an electrochromic interference from the transistors. The total viewable colour changing portion of each pixel device in a display arrangement is also affected due to that the area occupied by the electrochemical transistor is limiting the available area for the colour changing portion of the pixel device.

In order to address above drawbacks, alternative architectural configurations that involve manufacturing of vertical structures of a plurality of stacked layers of electrochemical and electrochromic material have been suggested. However, the manufacturing of that type of alternative architectural designs involves further drawbacks. After having considered the demands on precision and stability the suggested architectural configurations would require of the manufacturing process, in order to ensure that all the different layers are in correct alignment with each other in the finished product, the suggestions have been rejected as too complex to achieve, and rendering a too expensive product. The suggested architectures have also been rejected due to poor structural stability which would lead to devices with poor quality and low functional reliability.

SUMMARY OF THE INVENTION

The object of the present invention is to eliminate or at least to alleviate the above mentioned drawbacks and to provide an improved pixel device and pixel device architecture that is suitable for mass production.

These and other objects are met by the subject matters provided in the independent claims. Preferred embodiments of the invention are presented in the independent claims.

According to a first aspect thereof, the invention relates to a method for manufacturing a display arrangement comprising electrochromic pixel devices arranged in a matrix. In more detail the method comprises providing a continuous insulating layer comprising plastic, which layer forms a carrier or a middle unit carrier for said display arrangement, and in optional order:

providing a passage in said insulating layer, providing an electrical conductor in said passage, providing and/or attaching a first control layer to a first side of said insulating layer, providing an electrolyte control layer of solidified electrolyte in ionic contact with said first control layer, providing and/or attaching a first pixel layer to a second side of said insulating layer, providing an electrolyte pixel layer of solidified electrolyte in ionic contact with said first pixel layer;

arranging a second control layer in ionic contact with said electrolyte control layer, wherein one of said first and second control layers is electronically conducting and electrochemically active and the other is arranged of an electrochemically active organic material, which material has the ability of electrochemically altering its electronic conductivity through change of redox state thereof;

arranging a second pixel layer in ionic contact with said electrolyte pixel layer, wherein one of said first and second pixel layers is electronically conducting and electrochemically active and the other pixel layer is arranged of an electrochromic and electrochemically active organic material; and such that said electronic conductor in said passage is in electronic contact with said first control layer and first pixel layer, and said continuous insulating layer forms an insulating layer of each one of said pixel devices.

According to a second aspect thereof, the invention relates to a display arrangement comprising a plurality of electrochromic pixel devices arranged in a matrix, each pixel device comprising:

a pixel element comprising:

a first pixel layer arranged of an electrochromic and electrochemically active organic material, a second pixel layer facing said first pixel layer and being arranged of electrically conductive and electrochemically active material, a third pixel layer arranged of a solidified electrolyte which is arranged spatially between, and in ionic contact with, said first and second pixel layer, a control element comprising:

a first control layer arranged of an electrochemically active organic material which has the ability of electrochemically altering its electronic conductivity through change of redox state thereof, a second control layer of electrically conducting and electrochemically active material, a third control layer of a solidified electrolyte which is arranged between, and in ionic contact with, said first and second control layers, wherein said control element along a viewing direction normal to said first pixel layer is arranged behind said first pixel layer;

an insulating layer arranged between said pixel element and said control element, which insulating layer comprises a passage, and an electronic conductor arranged in said passage, wherein said electronic conductor is in electronic contact with that of said first or second pixel layer which is most adjacent said insulating layer, and in electronic contact with said first control layer, wherein said display arrangement comprises a continuous layer of insulating material comprising plastic, which layer has a thickness of at least 10 μm and forms said insulating layer of each of said plurality of electrochromic pixel devices.

According to third aspect thereof, the invention relates to an electrochromic pixel device comprising:

a pixel element comprising:

a first pixel layer arranged of an electrochromic and electrochemically active organic material, a second pixel layer facing said first pixel layer and being arranged of electrically conductive and electrochemically active material, a third pixel layer arranged of a solidified electrolyte which is arranged spatially between, and in ionic contact with, said first and second pixel layer, a control element comprising:

a first control layer arranged of an electrochemically active organic material which has the ability of electrochemically altering its electronic conductivity through change of redox state thereof, a second control layer of electrically conducting and electrochemically active material, a third control layer of a solidified electrolyte which is arranged between, and in ionic contact with, said first and second control layers, wherein said control element along a viewing direction normal to said first pixel layer is arranged behind said first pixel layer;

an insulating layer arranged between said pixel element and said control element, which insulating layer comprises a passage, and an electronic conductor arranged in said passage, wherein said electronic conductor is in electronic contact with that of said first or second pixel layer which is most adjacent said insulating layer, and in electronic contact with said first control layer.

According to a fourth aspect thereof, the invention relates to a method for manufacturing an electrochromic pixel device comprising in optional or the below order:

providing an insulating layer, providing a passage in said insulating layer, providing an electrical conductor in said passage;

attaching a first control layer to a first side of said insulating layer, providing an electrolyte control layer of solidified electrolyte in ionic contact with said first control layer, which electrolyte control layer corresponds to the third control layer introduced in relation to said first aspect of the invention;

attaching a first pixel layer to a second side of said insulating layer, providing an electrolyte pixel layer of solidified electrolyte in ionic contact with said first pixel layer; which electrolyte pixel layer corresponds to the third pixel layer introduced in relation to said first aspect of the invention;

providing a second control layer, arranging said second control layer in ionic contact with said electrolyte control layer, wherein one of said first and second control layers is electronically conducting and electrochemically active and the other is arranged of an electrochemically active organic material, which material has the ability of electrochemically altering its electronic conductivity through change of redox state thereof;

providing a second pixel layer, arranging said second pixel layer in ionic contact with said electrolyte pixel layer, wherein one of said first and second pixel layers is electronically conducting and electrochemically active and the other pixel layer is arranged of an electrochromic and electrochemically active organic material; and such that said electronic conductor in said passage is in electronic contact with said first control layer and first pixel layer.

In this application the terms electrolyte control layer and third control layer are used interchangeably in this application to denote the same technical feature.

In this application the terms electrolyte pixel layer and third pixel layer are used interchangeably in this application to denote the same technical feature.

In essence the present invention is based on an insight that by providing a carrier layer having passages provided with electronic conductors, the use of printing techniques for the production of a layered device is enabled. Hence, the manufacturing process of a layered architecture of an array of pixel devices is considerably facilitated, compared to known methods.

In other words, the present invention is based on the finding of a novel architectural configuration of an electrochromic device comprising a control element and an electrochromic pixel element, which are arranged on top of each other in a layered arrangement. Hence, the present invention is advantageous in that it provides a compact and stable architectural design of the pixel device, that also allow for simple and conventional printing techniques during manufacturing of the pixel device. In addition, the alignment requirements of the manufacturing process of the pixel device may be relaxed due to the architectural arrangement which may further reduce manufacturing complexity and increase manufacturing speed.

In yet other words, according to one example there is disclosed a method for manufacturing a display device arrangement, which comprises a plurality of electrochromic pixel devices arranged in a matrix. First a plastic insulating layer is provided comprising passages for electrical conductors. Thereafter, in optional order, electrical conductors are provided in the passages, pixel layers are arranged or printed on one side of the of the insulating layer, and control layers are arranged or printed on the other side of the insulating layer. By this method the manufacturing of a printed electrochromic pixel device arranged in a matrix is improved.

In relation to this invention the term "viewing direction" is a direction from the viewers' eyes to the pixel device, which direction is normal to the top pixel layer.

With reference to the pixel element of the present invention, the pixel element comprises a colour changing layer, indicative of the colour of the pixel, and a counter pixel layer, necessary for the electrochemical reaction of the colour changing layer. As is evident for the skilled man, he can e.g. choose to place the colour changing layer in front of said counter pixel layer, or behind said counter pixel layer, along said viewing direction, in accordance with his own preferences. Obviously, if the colour changing layer is placed behind the counter pixel layer, the counter pixel layer is preferably transparent or semi-transparent such that colour change of the colour changing material is visible.

Embodiments of above stated aspects are discussed in more detail below.

According to one embodiment, the layers of the pixel element and the layers of the control element are arranged substantially in parallel, e.g. the inclination between the layers measured in a cross section of the device, is between 0° to 2° or between 0° to 1° or between 0° to 0.5°. In more detail, the inclination between two totally flat layers, which are arranged on top of each other on a substrate, is always 0°; irrespectively of the specific rotation of the layers around an axis normal to a surface of the layer. This arrangement provides a robust architecture of the electrochromic pixel device, and is also advantageous in the manufacturing of the pixel device as it allows for the use of a manufacturing process comprising layered manufacturing.

According to one example, the passage is arranged in front of said first control layer of the control element along said viewing direction normal to the first control layer, which normally facilitates the arrangement of a compact pixel device. For other embodiments, where the passage is instead arranged to the side of said first control layer, a conductor or electrode, which is e.g. parallel to a first surface of the insulating layer, may be used for contacting said first control layer. Other arrangement of the conductor is also possible. When the control element is arranged to the side of the passage, the electronic contact between said electronic conductor and said first control layer, and between said electronic conductor and said first pixel layer, may be provided by an electrode or conductor arranged of a different material compared to said first control layer, said first pixel layer and/or said electronic conductor.

The control element may have a lateral arrangement, i.e. both the surface of said first control layer which is in ionic contact with said third control layer, and the surface of said second control layer which is in ionic contact with said third control layer, are facing the same direction. In other words, said first control layer and said second control layer may be arranged to the side of each other, but not necessarily in the same plane. Furthermore, said first and second control layers are bridged by said electrolyte. According to one example of a lateral arrangement, said first and second control layers are arranged side by side in a common plane.

The control element may also have a vertical arrangement, i.e. the surface of said first control layer, which is in ionic contact with said third control layer, and the surface of said second control layer, which is in ionic contact with said third control layer, are facing each other. In other words, said third control layer is normally sandwiched between said first control layer and said second control layer, but the control layers may also be arranged to the side of each other in a vertical arrangement as long as the layers are ionically connected via the electrolyte.

Compared to a lateral arrangement, a vertical arrangement normally provides shorter switching time of e.g. the first control layer and provides a more compact design, as the ion transporting cross-sectional area of the electrolyte is normally larger. With reference to this invention an ion transporting cross-sectional area is a cross-sectional area in the electrolyte through which substantially all charge carriers passes when travelling from a specific portion of the cathode to the anode or vice versa. Generally, in a vertical arrangement the cross-sectional area is parallel with the layers of the electrochemically active element, and in a lateral arrangement the cross-sectional area is normally orthogonal to the layers of the electrochemically active element. For a 3-dimensional layer of electrolyte ionically connecting two electronic conductors in either a lateral or a vertical arrangement, the thickness of the layer is measured normal to the interfaces between the electrolyte and the electronic conductors. The cross-sectional area of the electrolyte in a lateral arrangement is usually the width of the electrolyte times the thickness of the electrolyte, wherein the width of the electrolyte is measured in a direction normal to the thickness of the electrolyte as well as substantially normal to the direction of a net flow of positive or negative charges between the electrolyte and the electrode taken half way between the electrodes. For a 3-dimensional layer of electrolyte, the cross-sectional area of the electrolyte in a vertical component is usually the width of the electrolyte times the length of the electrolyte, i.e. normally the surface area of the electrolyte.

It is to be understood that the switching time is in general determined by e.g.:

the mobility of ions in the electrolyte, the higher the mobility the shorter the switching time;

the size of the ionic current in the electrolyte, which is determined both by the ion mobility in the electrolyte as well as the size of the electrolyte volume;

the choice of electrochemically active material, the volume of the electrochemically active material, which needs to be reacted, before the electrochemically layer is switched, i.e. the electronic conductivity is sufficiently altered, the amplitude of the applied voltage, the larger the voltage the lower the switching time etc.

In an embodiment, the cross-sectional area of the passage of the pixel device may be e.g. between 10 $\mu m^2$ and 2 $mm^2$. According to another example the area is between 100 $\mu m^2$ and 0.5 $mm^2$. According to yet another example the area is between 500 $\mu m^2$ and 0.2 $mm^2$. According to yet another example the area is between 1000 $\mu m^2$ and 0.1 $mm^2$. The cross-sectional area is measured orthogonal to the extension of said passage, i.e. if the passage is shaped as a conventional hollow cylinder having a base radius r, the cross-sectional area of the passage is $pi*r^2$. As is apparent for the skilled man, a relatively large cross-sectional area of the passage is advantageous in that it provides a higher level of conductivity.

It is normally easier to obtain electronic contact e.g. between the electronic conductor and the first control layer using a larger cross-sectional area. On the other hand, a reduced cross-sectional area of the passage improves the switching properties of the control element and/or the pixel element of the pixel device. A reduced cross-sectional area of the passage allows, for example, for a reduced electrolyte volume which reduces the switching time, as discussed above.

The cross-sectional area of said third pixel layer may be larger than the cross-sectional area of said third control layer, and/or said third pixel layer may be arranged so as to cover said third control layer. According to one embodiment the cross-sectional area of said third pixel layer is at least twice as large as the cross-sectional area of said third control layer; or at least five times or at least ten times or at least 50 times as large as the cross-sectional area of said third control layer.

Independently of the spatial relationship between said third pixel layer and said third control layer, said first and/or second pixel layer may be larger than the cross-sectional area of said third control layer, or said first and/or second pixel layer may be arranged so as to cover said third control layer. According to one embodiment the cross-sectional area of said first or second pixel layer is twice as large as the cross-sectional area of said third control layer; or at least five times larger, or at least ten times larger, or at least 20 times larger, or at least 50 times larger as the cross-sectional area of said third control layer.

A larger first, second or third pixel layer facilitates the arrangement of the control element behind said pixel element, such that said control element is hidden by said pixel element. Conventional side by side architectural arrangement of a transistor and pixel cell element implies limitation of the fill factor since the transistor element occupies some of the total available area. By covering the control element by the pixel element the fill factor of the pixel device is increased with a maintained ease of manufacturing as an isolating layer is provided, which lowers the demands on precision at the manufacturing. Further, an improved fill factor implies an improved display perception, and other display parameters such as display resolution.

In order to prevent an undesired flow of charges, the cross-sectional area of said third control layer is preferably at least equal to, or slightly larger, than the cross-sectional area of said passage, such that said third control layer covers said passage. Preferably, the perimeter of said electron conductor is slightly smaller than the perimeter of said third control layer such that the presence of leakage current is minimised. A cross-sectional area of said third control layer that to some extent is larger than the opening area of said passage further allows for a relaxation of alignment requirements during manufacturing. For example, an allowance for relatively small dimensional lateral variations in a manufacturing printing step of providing said third control layer in relation to said passage may be achieved.

According to an embodiment, the cross-sectional area of said third control layer is equal to the cross-sectional area of said passage. Alternatively, the cross-sectional area of said third control layer is at least larger, or at least two times larger, or at least ten times larger, than the cross-sectional area of said passage on a side facing said third control layer.

For some manufacturing techniques, the electrical conductor provided in said passage is arranged only on the inner sides of said passage which implies that the electrical conductor has a hollow or tubular shape, having an inner and an outer perimeter, wherein at least said outer perimeter corresponding to the perimeter of said passage. Other arrangements of the electrical conductor in said passage are possible, as long as the conductor provides an electronic connection between said electrochemically active layers.

In an embodiment of the pixel device the electronic conductor arranged in the passage and/or said first, second and/or third pixel layer and/or said first, second and/or third control layer is/are provided on a respective carrier or layer by means of printing techniques. In more detail, when providing an electrical conductor in said passage, a first control layer on or to a first side of the insulating layer, and/or providing a first pixel layer on or to a second side of said insulating layer, this may be performed by means of printing techniques.

Further, providing an electrolyte control layer in ionic contact with the first control layer and/or an electrolyte pixel layer in ionic contact with the first pixel layer may also be performed by means of printing techniques.

Hence, the electronic conductor, that is providing the electronic link between the control element and the pixel element of the pixel device, may preferably be arranged of a material comprising printable material, i.e. a material which e.g. have suitable rheological properties in order to be printable. Inks comprising electrically conductive polymers are one example of such printable materials. Likewise, the electronic conductor may be formed, or partly formed, of a printable material in order to facilitate manufacturing. During manufacturing of the pixel device, the electronically conductive material may be arranged in said passage by a number of different printing techniques, such as bar-coating, screen-printing, inkjet printing, spin-coating etc., or by applying the material at the passage and pressing it into said passage by pulling a squeegee across said passage. It should also be understood that the insulating layer having the passages arranged with the electronic conductor may be prefabricated or partly prefabricated. For example, the passages and the electronic conductor may be applied or arranged during a pre-manufacturing process.

Furthermore, according to one embodiment of the invention the second control layer is arranged in ionic contact with the electrolyte control layer by means of a lamination process. In other words, the second control layer is arranged on a first carrier and the electrolyte control layer is arranged on a second carrier, which is different from said first carrier. Thereafter, said first and second carriers are brought together automatically, e.g. in a roll-to-roll process, such that the two layers attaches to each other. Additionally, or alternatively, the second pixel layer may be arranged in ionic contact with the electrolyte pixel layer by means of a similar lamination process, which attaches the two layers to each other. Generally, any two layers may be arranged in contact with each other by means of a lamination process similar to the one described above.

In optional embodiments of the pixel device, the electronic conductor may comprise an electron conductive material such as electronically conductive polymers such as PEDOT: PSS (poly(3,4-ethylenedioxythiophene) poly(styrenesulfonate)), carbon, inert metals or electrochemically inert metals such as gold, or other conducting material suitable for being in contact with electrochemically active layers, or combinations of such electron conductive materials. Normally, conducting materials suitable for being in contact with electrochemically active layers are inert such that they do not give rise to substantial electrochemical reactions. These materials may e.g. be provided as an ink or paste which is arranged in the passage during a manufacturing, or pre-manufacturing process.

Moreover, the thickness of said first control layer of the pixel device may in an embodiment be between 0.1 µm and 7 µm, or between 0.3 µm and 1 µm, or between 0.01 and 0.5 µm, as a thinner layer normally equals a shorter switching time of the pixel device. Further, the thickness may also be between 0.01 µm and 7 µm, or between 0.1 µm and 1 µm, or between 0.3 µm and 0.5 µm. The thickness of said control layer is measured along a viewing direction normal to said first pixel layer. According to optional methods of providing the first control layer, the layer may be provided by a number of conventional printing techniques, such as spin-coating, inkjet printing, screen-printing, ionic self-assembled multilayer, aerosol-jet printing or bar-coating.

In yet an embodiment of the invention, the insulating layer comprises plastic or is formed of a layer comprising plastic, a plastic insulating layer, a plastic film or plastic foil such as a polyester foil. As for the plastic insulating layer or the insulating layer comprising plastic, it may involve e.g. films, foaming films or laminated films thereof comprising, for example, polyolefin such as polyethylene, polypropylene or the like; polyester such as polyethylene terephthalate, polyethylene naphthalate, polybutylene terephthalate or the like; polyvinyl chloride, polystyrene, polyurethane, polycarbonate, polyamide, polyimide, poly methyl methacrylate, polybutene, polybutadiene, poly methyl pentene, ethylene-vinyl acetate copolymer, ethylene (meth) acrylic copolymer, ethylene (meth) acrylate copolymer, ABS resin, ionomer resin or the like, but is not limited to theses examples. Also, as for layers, commercial films can be used, and films formed by a cast film process using a process material may also be used.

According to one embodiment, the insulating layer or the plastic insulating layer forms a carrier or a middle unit carrier for said device. In other words, the properties of the plastic insulating layer is chosen such that a control layer and/or a pixel layer may be arranged on a respective one of its sides by means of printing techniques in an automated process. A carrier may e.g. be a formed of a homogeneous material, or formed of a layered material. Preferably, the insulating layer or the plastic insulating layer is flexible. According to one embodiment all materials, or all layers, forming the pixel device or the display arrangement is flexible, such that the resulting pixel device or display arrangement is also flexible. In other words it may be repeatedly bent or rolled without breaking. When bending or rolling the device the radius of curvature is less than e.g. half the length of the display arrangement.

According to one example the step of providing a passage in said insulating layer, is performed by means of laser techniques, preferably by means of laser-drilling. When the passage in the insulating layer is manufactured by means of drilling or laser drilling, a material of sufficiently high melting point is preferably selected, such that the area around the passage is not damaged by the drilling. According to one embodiment of the invention the thickness of the insulating layer is between 20 µm and 150 µm. According to some examples the thickness of the insulating layer is at least 10 µm, or at least 20 µm, or at least 50 µm. Further, the thickness of the insulating layer is at most 200 µm, or at most 150 µm, or at most 100 µm. Additionally, the thickness of the insulating layer may be within an interval of any of these higher and lower limits, such as 10 µm to 150 µm or 50 µm to 150 µm.

According to one embodiment at least one of said first pixel layer, second pixel layer, first control layer, and second control layer is formed of an electrically conducting polymer. Furthermore, according to one embodiment, all of said layers are formed of electrically conducting polymer, and furthermore all of said layers may be arranged of the same material. This is advantageous as the manufacturing process is facilitated when the same material is used for all layers.

In some devices an isolating layer is arranged between said first control layer and said second control layer, wherein the isolating layer is provided with an opening so as to define the contact area between said third control layer and said first control layer. The isolating layer may e.g. be provided in order to minimize leakage currents or the risk for leakage currents as well as to shorten the switching time of the pixel device. The isolating layer may also be provided in order to improve the stability and alignment requirements during the manufacturing of the pixel device.

A display having several separately addressable pixels may be provided by arranging a plurality of electrochromic pixel devices each arranged in accordance with any one of the preceding embodiments. Advantageously, the pixel devices are arranged in a matrix arrangement which allow for an actively addressed matrix arrangement.

The display with several pixels may comprise a continuous layer of electronically conductive material forming one of said first or second pixel layers of at least some of said plurality of electrochromic pixel devices. In other words, the top pixel layer of several pixels may each be a separate portion of a continuous layer.

Additionally, the display with several pixels may comprise a continuous layer of insulating material forming said insulating layer of at least some of said plurality of electrochromic pixel devices. In other words, the insulation layer of several pixels may each be a separate portion of a continuous layer.

Generally, the vertical architectural configuration of the pixel device according to the present invention allow for a manufacturing process comprising conventional printing techniques. Such conventional printing techniques may encompass printing, bar coating, screen printing, spin-coating, ink-jet printing, aerosol-jet printing, or any other such manufacturing procedure. The architecture of the pixel device also allow for use of manufacturing procedures that are easily scalable to large-scale manufacturing, which, in turn, allow for faster and low price manufacturing. For example, a display arrangement comprising a plurality of pixel devices according to the present invention may be manufactured in a roll-to-roll manufacturing procedure.

Definitions

Electrochemically active: an "electrochemically active" element according to the present invention, is a piece of a material having an electronic conductivity that can be electrochemically altered through changing of the redox state of said material. Normally, at least a portion of an electrochemically active element is in ionic contact with an electrolyte, and the electrochemically active element may furthermore be integrated with an electrode, being composed of the same or different materials. The electrode may also be arranged on top of said electrochemically active material.

Electrochromic element: an "electrochromic element" in relation to this invention is a continuous geometrical body, which can be patterned to different shapes, and is composed of one material or a combination of materials. The material(s) may be organic or inorganic, low molecular or polymeric. Such an electrochromic element, whether it is composed of one material or is an ensemble of more than one material, combines the following properties: at least one material is electrically conducting in at least one oxidation state, and at least one material is electrochromic, i.e. exhibits colour change as a result of electrochemical redox reactions within the material. Optionally, the electrochromic element may comprise an electrochemically active material.

Electrochromic display: an "electrochromic display" is in relation to this invention a device comprising at least one electrochromic pixel element, which device is arranged such that a colour change of the electrochromic element is visually detectable in reflection and/or in transmission.

Solidified electrolyte: for the purposes of the invention, "solidified electrolyte" means an electrolyte, which at the temperatures at which it is used is sufficiently rigid that particles/flakes in the bulk therein are substantially immobilised by the high viscosity/rigidity of the electrolyte and that it does not flow or leak. In the preferred case, such an electrolyte has the proper rheological properties to allow for application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte may for example comprise an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochromic device is arranged, so that the support forms an integral part of the operation of the electrochromic device.

Electrodes: "electrodes" in devices according to the invention are structures that are composed of an electrically conducting material and one example of an electrode is the electronic conductor which is arranged in said passage. The electrodes may be connected to e.g. a portion of an electrochemically active pixel layer or control layer which in turn may be in direct contact with the electrolyte. For example, by inducing a first potential in an electrode or wire closest to the first pixel layer portion, and a different potential in the second pixel layer, an electric field within the solidified electrolyte layer is created and preferably sustained for a time period long enough for the desired colour changes to occur. Furthermore, when electrodes for example are in contact with electrochemically active material, the electrodes are preferably formed of conducting material that is suitable in relation to the electrochemically active material. The electrodes may comprise any electronically conducting material, such as metal, conducting carbon, titanium, platinum, graphite, graphene, noble metals and/or inert metals.

Layer: according to one embodiment, the pixel device has a laminate structure and consists of "layers" of different materials. These layers can be continuous or patterned, and can be applied to each other (self-supporting device) or to a support or carrier (supported device). These terms, self-supporting/supported, may also be used for a separate layer. A self-supporting layer is a layer which may be handled on its own and e.g. mounted in a printing machine, without collapsing and without the need of additional supporting layers. Furthermore, the term layer may encompass all of the same material in the same plane, regardless whether this material is patterned or interrupted in such a way as to form discontinuous "islands" in the plane.

Direct electrical contact: Direct physical contact (common interface) between two phases (for example between electrochemically active organic material and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example counter element and electrolyte or electrolyte and electrochromic element, or by occurrence of capacitive currents due to the charging of the Helmholtz layer at such an interface.

As described herein, two material may be in ionic contact with each other, e.g. via a third material. Ionic contact between two elements is provided by at least one material capable of transporting ions between the two elements. An electrolyte, in direct contact (common interface) with a first and a second electrochemically active layer, is one example of a material which may provide ionic contact between the two layers. The electrolyte may hence be referred to as an ionic conductor.

As described herein, two materials may be in electronic contact with each other, e.g. via a third material. Electronic contact between two elements is provided by at least one material capable of transporting electrons between the two elements. A layer of carbon, in direct contact (common interface) with a first and a second electrochemically active layer, is one example of a material which may provide electronic contact between the two layers. The layer of carbon may hence be referred to as an electronic conductor.

As described herein, two materials may be in electric contact with each other, e.g. via a third material. Electric contact between two elements is provided by one or a series of materials, each capable of transporting electrons and/or ions between the two elements.

Dynamic display: in certain embodiments of the invention, a "dynamic display" is provided. The colour change in the electrochromic element(s) in such a display is reversed upon removal of the energy source. This can for instance be achieved by the arrangement of a capacitor in parallel with said electrochromic element.

Bi-stable display: in certain embodiments of the invention, a "bi-stable display" is provided. The effects of a colour change in the electrochromic element(s) in such a device remain after removal of the external voltage.

Colour change: when reference is made to "colour change", this is also meant to include changes in optical density or reflectance, so that "colour change" for example takes into account changes from blue to red, blue to colourless, colourless to blue, dark green to light green, grey to white or dark grey to light grey alike.

Materials

For example, the solidified electrolyte comprises a binder. It is preferred that this binder have gelling properties. The binder is preferably selected from the group consisting of gelatine, a gelatine derivative, polyacrylic acid, polymethacrylic acid, poly(vinylpyrrolidone), polysaccharides, polyacrylamides, polyurethanes, polypropylene oxides, polyethylene oxides, poly(styrene sulphonic acid) and poly(vinyl alcohol), and salts and copolymers thereof; and may optionally be cross-linked. The solidified electrolyte preferably further comprises an ionic salt, preferably magnesium sulphate if the binder employed is gelatine. The solidified electrolyte preferably further contains a hygroscopic salt such as magnesium chloride to maintain the water content therein. The electrolyte may be formed by one of the materials listed above or by a combination of two or more of these materials.

In embodiments, the electrochromic pixel device comprises, as electrochromic material and/or electrochemically active material, a polymer which is electrically conducting in at least one oxidation state, and optionally also comprises a polyanion compound.

Electrochromic polymers for use in the electrochromic pixel device of the invention are for example selected from the group consisting of electrochromic polythiophenes, electrochromic polypyrroles, electrochromic polyanilines, electrochromic polyisothianaphthalenes, electrochromic polyphenylene vinylenes and copolymers thereof, such as described by J C Gustafsson et al in Solid State Ionics, 69, 145-152 (1994); Handbook of Oligo- and Polythiophenes, Ch 10.8, Ed D Fichou, Wiley-VCH, Weinheim (1999); by P Schottland et al in Macromolecules, 33, 7051-7061 (2000); by M Onoda in Journal of the Electrochemical Society, 141, 338-341 (1994); by M Chandrasekar in Conducting Polymers, Fundamentals and Applications, a Practical Approach, Kluwer Academic Publishers, Boston (1999); and by A J Epstein et al in Macromol Chem, Macromol Symp, 51, 217-234 (1991). In an embodiment, the electrochromic polymer is a homopolymer or copolymer of a 3,4-dialkoxythiophene, in which said two alkoxy groups may be the same or different or together represent an optionally substituted oxy-alkylene-oxy bridge. In yet an embodiment, the electrochromic polymer is a homopolymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly(styrene sulfonate). As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behaviour. For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT-PSS, being both conducting and electrochromic; a piece of PEDOT-PSS with $Fe^{2+}/SCN^-$, PEDOT-PSS being conducting and electrochromic and $Fe^{2+}/SCN^-$ being an additional electrochromic component (see below); a piece composed of a continuous network of conducting ITO particles in an insulating polymeric matrix, in direct electrical contact with an electrochromic WO3-coating; a piece composed of a continuous network of conducting ITO particles in an insulating polymeric matrix, in contact with an electrochromic component dissolved in an electrolyte. As described above, an electrochromic pixel device may comprise a further electrochromic material for realisation of displays with more than one colour. This further electrochromic material can be provided within the electrochromic pixel element or the solidified electrolyte, which then for example comprises an electrochromic redox system, such as the redox pair of colourless $Fe^{2+}$ and $SCN^-$ ions on one hand, and of red $Fe^{3+}$ $(SCN)(H_2O)_5$ complex on the other. By way of further, non-limiting example, such materials may be selected from different phenazines such as DMPA—5,10-dihydro-5,10-dimethylphenazine, DEPA—5,10-dihydro-5,10-diethylphenazine and DOPA—5,10-dihydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, p-ethoxychrysoidine, methylene blue, different indigos and phenosafranines, as well as mixtures thereof.

Generally, other objectives, features, and advantages of the present invention will appear from the following detailed disclosure, from the attached dependent claims as well as from the drawings. Embodiments of the invention will now be described, by way of example, with reference to the accompanying drawings. It should be understood that the drawings are not true to scale and, as is readily appreciated by a person skilled in the art, dimensions other than those illustrated in the drawings are equally possible within the scope of the invention.

DETAILED DESCRIPTION OF THE INVENTION

Figure 1:
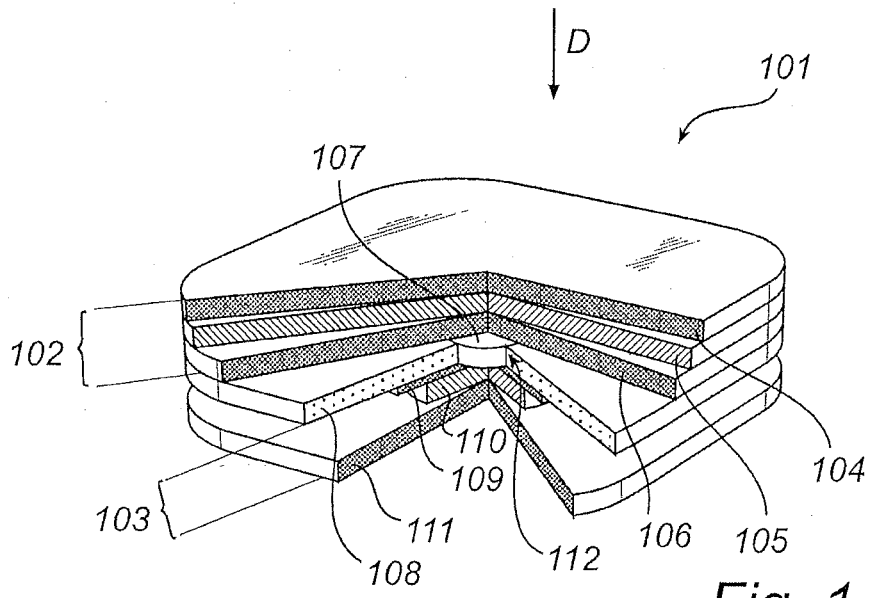
FIG. 1 is a schematic perspective and partially cross-sectional view of an embodiment of the electrochromic pixel device.

An electrochromic pixel device according to an embodiment of the invention is shown in FIG. 1. The electrochromic pixel device 101 has a vertical architecture and the device involves two main elements. These are a pixel element 102 and a control element 103 which comprise a plurality of layers. An insulating layer 108 is separating the pixel element and the control element, and the control element is arranged behind the pixel element in the pixel device defined along a viewing direction D associated with the pixel device.

The pixel element 102 is an electrochromic element and comprises a first pixel layer 104 and a second pixel layer 106, both comprising electrochemically active material, which may be electrochemically active organic material. A third pixel layer or electrolyte pixel layer 105 which is an ion conductive layer arranged of a solidified electrolyte is sandwiched between said first and second pixel layer so as to achieve ionic contact between the first and second pixel layers. The pixel element may change colour, and is arranged so that at least one pixel layer changes colour in such manner that it is visually detectable in reflection and/or in transmission. In an embodiment, the first pixel layer 104 changes colour when subject to electrochemistry and may be arranged first in reference to the second pixel layer along the viewing direction D of the pixel device. The spatial relationship between said first and second pixel layer 104, 106 may be reversed such that the second pixel layer is in front of the first pixel layer along direction D. Generally, the layers in front of the colour changing layer of the pixel element are preferably transparent or semi-transparent, such that the colour change of the pixel device can be seen.

The control element 103 controls the colour change of the pixel element, and comprises an electrochemically active element 109. In more detail, the control element 103 comprises a first control layer 109 and a second control layer 111 which layers comprise an electrochemically active material, which may be an electrochemically active organic material. A third control layer or electrolyte control layer 110 which is an ion conductive layer arranged of a solidified electrolyte is sandwiched between said first and second control layers so as to achieve ionic contact between the first and second control layers 109, 111.

As shown in FIG. 1, the pixel element 102 and the control element 103 are each arranged in a respective vertical configuration wherein the layers involved in each element are arranged in a laminated and stacked arrangement.

The insulating layer 108 of the pixel device comprises a passage 112 formed in the insulating layer and extending through the insulating layer 108, from one surface side of insulating layer to the other surface side, thereby forming a path that is connecting the pixel element 102 and control element 103. The passage is provided with an electrical conductor 107, or means for electronic contact, that is arranged in the passage and in electrical or electronic contact with the pixel element 102 and the control element 103. Hence, the passage 112 in the insulating layer forms an electrically conducting link between the pixel element 102 and the control element 103. The electrical conductor is formed of an electron conducting material, for example a material comprising carbon, such as carbon paste, which is easy to provide in the passage by conventional printing techniques.

According to an embodiment, said first and second pixel layers 104, 106 of the pixel element are formed of an electrochromic polymer material. As discussed above, such electrochromic polymer may be PEDOT:PSS, or other polymeric material with electrochemically active characteristics. With reference to the pixel element 102, it is sufficient that one of the layers have electrochromic characteristics in order to provide display functionality. The third pixel layer is preferably arranged such that electrochemistry will occur when a sufficiently high voltage is applied across the electrolyte, which, in turn, changes the colour of the pixel element. Normally, one of the first or second pixel layer may be arranged to function as the counter electrode in the electrochemical process, wherein the other layer forms the active colour changing layer of the pixel element. In FIG. 1, the layers of the pixel device are arranged substantially in parallel with each other.

Referring to the control element 103, the first control layer 109 is arranged on a control side of the insulating layer 108 and in contact with the electrical conductor 107 in the passage 112 in the insulating layer 108, and may be formed of electrically conductive polymer material such as PEDOT:PSS, or another material with electrochemically active characteristics, as discussed above. As illustrated in FIG. 1, the first control layer 109 of the control element is arranged on or in contact with a surface of the insulating layer 108 that is on the opposite side of the insulating layer relative the pixel element 102. The third control layer 110 is formed of a solidified electrolyte, that is arranged between, and in ionic contact with, the first control layer 109 and the second control layer 111. Portions of the third control electrolyte layer 110 and portions of the first control layer 109 together with the second control layer 111 thereby form the active control element which controls the electrochromic effect of the pixel element 102. The electrolyte layer 110 is arranged so as to allow an electrochemical reaction to take place when a potential difference is provided, for example, between the first and second control layers 109, 111. The electrochemical reaction, in turn, controls the conductivity of the first control layer 109 which controls the electrochromic effect of the pixel element by way of the electrical conductor 107 in the passage 112. In more detail, the possibility of altering the colour of the active colour changing layer, by applying a voltage difference between 109 and 104, is switched from enabled to disabled by electrochemically reacting the first control layer 109 from an electron conducting to an electron isolating state. Accordingly, the first control layer 109 may be switched from an electron isolating to an electron conducting state by reversed operation.

In an embodiment, the first and second pixel layer 104, 106 and first and second control layer 109, 111 may comprise an organic polymer material, that may be bar coated, spin-coated, ink-jet printed, or arranged as ionic self-assembled multi layers. In an embodiment, the first or second pixel layers may be uniformly bar coated, followed by a delimitation step where the pixel area is defined and delimited in a planar direction coinciding with the planar direction of the layered architectural configuration of the pixel device 101. The delimitation may be used to separate different pixels from each other in a display configuration comprising a plurality of pixel devices. This allows for a pixel design wherein at least one layer of each pixel device may be formed of a continuous piece of material. The delimitation may also be used to prevent crosstalk between pixel devices in a display arrangement and allow for individual addressing of a pixel device in a display arrangement.

Figure 2:
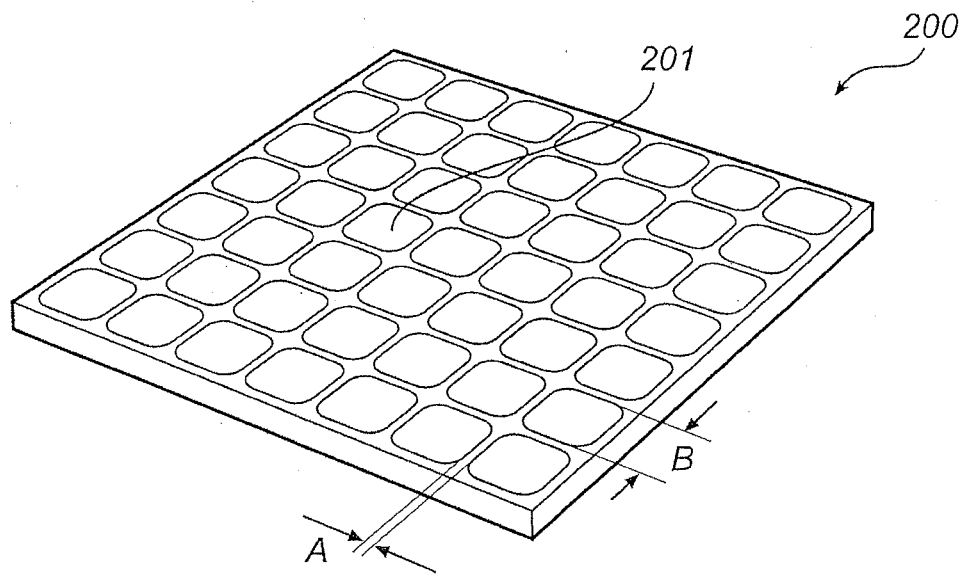
FIG. 2 is a schematic perspective view of a display formed of a number of electrochromic pixel devices arranged in a matrix arrangement.

FIG. 2 illustrates a schematic display 200 having several separated pixels formed of an embodiment of the pixel device according to the present invention. A plurality of pixel portions 201 are arranged in a matrix configuration, wherein each pixel portion defines a pixel device according to the present invention. A common property of measuring a display relates to the fill factor. The fill factor is associated with the effective area of each pixel in comparison with the given area of the complete display. The fill factor may be derived from the illustrated dimensions A and B. The distance A corresponds to the distance between two separate pixel portions and is indicative of how close two pixels are placed or of how large ineffective area there is in the display. The dimension B illustrates a typical dimension measure of a pixel portion 201 which corresponds to the cross-sectional area of the pixel element illustrated in FIG. 1. Generally, a relative decrease of the distance A implies an increase of the fill factor, and a relative increase of the dimension B implies an increase of the fill factor. In an embodiment, the fill factor of a display comprising pixel devices according the present invention may be 90%.

In one embodiment, referring to FIG. 2, the geometrical shape of each pixel device is square formed with rounded corners. Alternatively, the geometrical shape of each pixel device in a display arrangement may be individual for each pixel and have an arbitrary shape, such as square, circular, oblique, multi cornered, etc., or a free geometrical shape that may illustrate an image or be a part of an image.

According to the present invention, the architectural design of the current pixel device comprising an insulating layer having passages allow for a vertical placement of the electrochemical control element behind the pixel element, which, in turn, allow for a display arrangement with improved fill factor compared to lateral designs, as illustrated by the display 200.

In an embodiment, in order to define and delimit a layer of a single pixel device in a larger layer of a conducting polymer, which may e.g. be uniformly bar coated on a substrate, the first pixel layer 104 or the second pixel layer 106 can be produced in the larger layer in an area corresponding to the pixel element portion 201, by means of additive or subtractive methods. Examples of subtractive methods are cutting or scraping the larger layer, or by etching, such that portions of the subjected layer is removed. Examples of additive methods are to bleach, add a delimiting medium, or by other means altering conductive or electrochemical properties of the subjected layer.

According to the invention, delimitation may also be used to delimit the layer intended for being covered by solidified electrolyte. In an embodiment, a delimitation of the electrolyte is achieved by using of a delimiting medium with a low surface energy, such as polytetrafluoroethylene. By printing boarders of low surface energy material, the electrolyte may be confined to the surface inside the boarders.

The layers of the pixel device may also be printed or applied only in predetermined areas or portions, without the use of additive or subtractive methods or delimitation medium, such that the intended patterning of the layers is achieved. For example, the layers may be patterned directly during printing or manufacturing.

With reference to the insulating layer 108, the passage may in an embodiment be achieved by means of laser techniques. For example, a laser machine may be used to drill the passage in suitable dimension by using single shot or repetitive shots techniques. The dimension of the passage in the insulating layer effects the switching time of the pixel device, since the passage 112 forms an operational control link between the control element and the electrochromic pixel element.

Figure 3A:
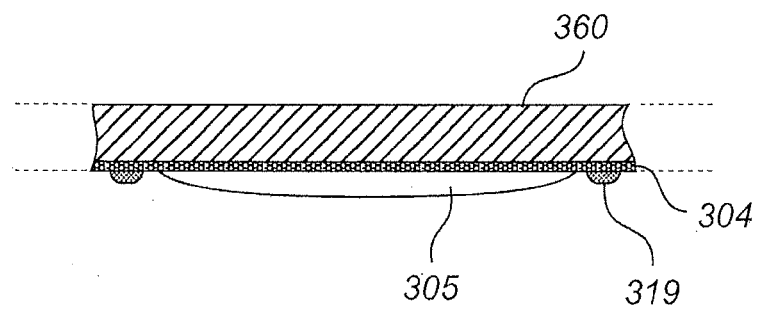
FIGS. 3a-3d are schematic cross-sectional views of layered embodiments of the pixel device divided into one top unit, two alternative middle units, and one bottom unit, referred to as FIGS. 3a, 3b or 3c, and 3d, respectively.
Figure 3B:
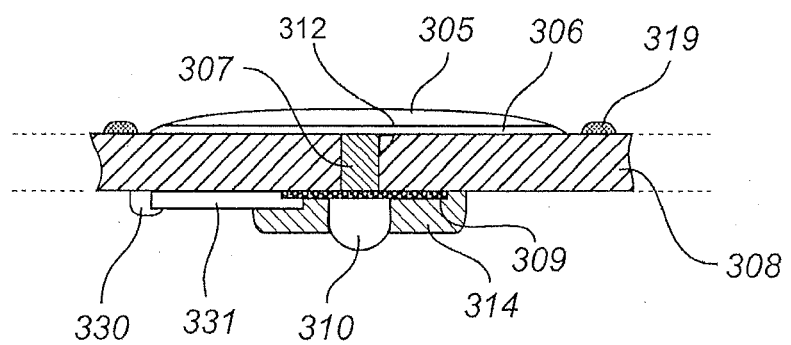
Figure 3C:
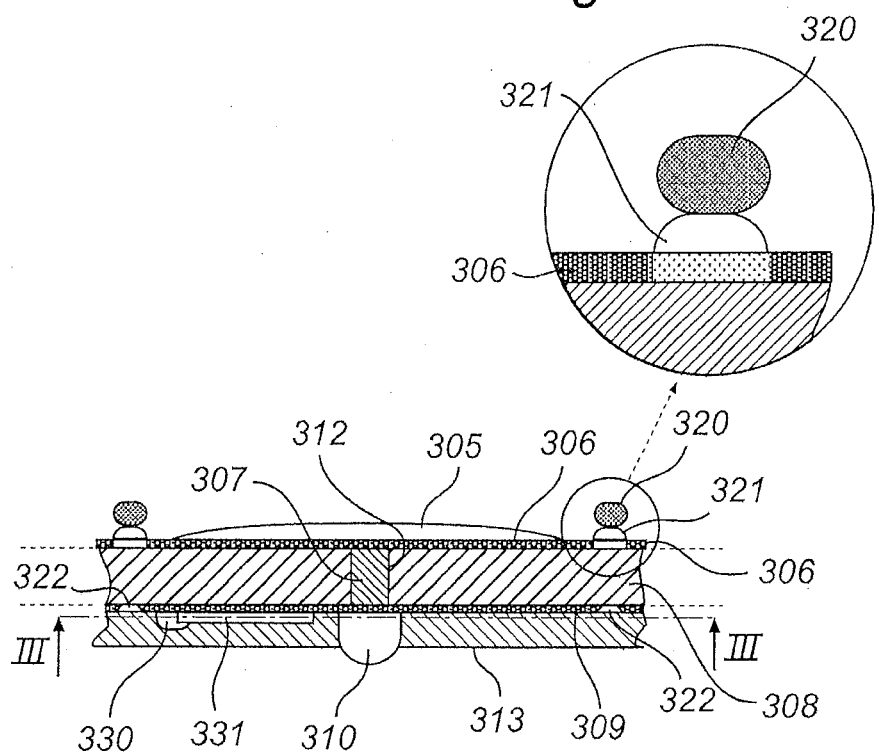
Figure 3D:
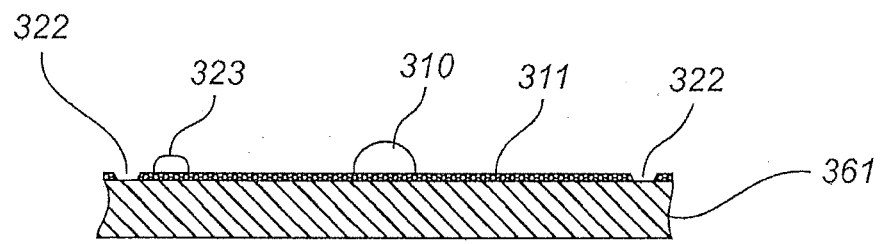

FIG. 3a-d show an embodiment of a typical electrochromic pixel device which is separated in four different units: one top unit in FIG. 3a, two alternative middle units in FIG. 3b and FIG. 3c, and one bottom unit in FIG. 3d. A pixel device may be formed by combining the top unit, one of the two embodied middle units, and the bottom unit, which may be achieved in a lamination process. The electrochemical and electrochromic layers of the pixel device is in this embodiment formed of the electrochemical and electrochromic polymer PEDOT:PSS, but alternative materials may be utilized, as discussed above. FIG. 3a-d is also illustrative of an embodiment of the manufacturing process of the pixel device, in which each unit is manufactured in a separate process, after which the units are arranged, aligned and merged together in subsequent manufacturing phase. It should be understood, which is evident for the skilled person, that the pixel device according to the present invention may be manufactured and assembled in alternative orders. For example, the pixel device may be manufactured by initially printing on the insulating layer, or the pixel device may be laminated in a sequential order starting with the any of layers of the pixel or control element.

With reference to FIG. 3a, a schematic cross-sectional view of an embodiment of a top unit of the pixel device is shown. The top unit comprises a transparent, or semitransparent, substrate or carrier 360 which on one surface is arranged with a PEDOT:PSS layer 304. In a typical pixel display arrangement comprising a plurality of pixel devices, the substrate and the PEDOT:PSS layer constitute a common structure for the plurality of pixel devices, wherein each pixel device is associated with an area forming a pixel element portion in the PEDOT:PSS layer. In the embodiment, the pixel element portion is defined, or patterned, with a delimiting medium 319, such as low surface energy material that is deposited by printing techniques onto the PEDOT:PSS layer. The delimiting medium is deposited so as to provide a grid pattern defining a plurality of pixel element portions, wherein an electrolyte layer 305 can be arranged in each separate pixel element portion of the PEDOT:PSS layer 304.

With reference to FIG. 3b, a schematic cross-sectional view of an embodiment of a middle unit of the pixel device is shown. The middle unit comprises an insulating layer 308 that is arranged with a passage 312. The passage is a through hole and may be achieved by laser drilling of the insulating layer. An electrical conductor 307, for example formed of PEDOT:PSS or carbon, is arranged in the passage so as to obtain an operational electrical connection from one side of the insulating layer to the other side of the insulating layer. Each pixel device in a display arrangement has a corresponding passage, and, in analogy with the above description of the top unit, a plurality of passages may be arranged in the middle unit substrate, or middle unit carrier, so as to achieve a matrix of passages. Referring to FIG. 3b, the surface on the pixel side of the middle substrate is arranged with delimiting medium 319 which defines a pixel element portion on the substrate. In the pixel element portion, a PEDOT:PSS layer 306 is arranged on the substrate and in contact with the electrical conductor in the passage. In this embodiment of the middle unit, the upper surface PEDOT:PSS layer is only supplied in the pixel element portion and is thereby separated from similar PEDOT:PSS layers of neighbouring pixel devices. The PEDOT:PSS layer 306 on the pixel side surface is covered with a layer of solidified electrolyte 305 which is arranged by suitable printing procedure. The solidified electrolyte layer is only supplied to the pixel element portion defined by the delimiting medium and the electrolyte is thereby delimited to this region.

The control side surface of the middle unit substrate is applied with a first control layer also called a PEDOT:PSS layer 309, which layer forms a part of the control element of the pixel device. The PEDOT:PSS layer 309 may be arranged onto the substrate by means of suitable patterning or printing techniques, and is in electrical contact with the electrical conductor 307 in the passage. In order to be able to supply a voltage to the PEDOT:PSS layer 309 in the vicinity of the passage, the PEDOT:PSS layer on the control side surface may be arranged with a middle unit electrode 330, formed of a suitable electrode material. In addition to the middle layer electrode, the PEDOT:PSS layer 309 is arranged with an electrode extension 331, reaching from the electrode in a direction towards the passage in order to increase the conductivity. The PEDOT:PSS layer and the electrode on the control side surface of the middle substrate, or carrier, is insulated with a separating layer 314 of an isolating material. The separating layer 314 is arranged with an open channel, or open portion, in which open channel, or portion, a layer of solidified electrolyte 310 is arranged in contact with the PEDOT:PSS layer. In other words, the open channel, or portion, of said separating layer 314 defines the extension of the interface between the electrolyte and the PEDOT:PSS layer.

A second alternative embodiment of the middle unit of the pixel device is shown in FIG. 3c. This embodiment of a middle unit is arranged as described in relation to FIG. 3b, with the exception that the PEDOT:PSS layer 306 on the pixel side is formed of a continuous coated layer wherein patterning and delimitation of neighbouring pixel devices is achieved by subtractive methods, such as etching, or additive methods, such as bleaching with a bleaching medium 321 such as NaOCl. As discussed in relation to FIG. 3b, a delimiting medium 320 may be used to define the portion of the PEDOT:PSS on the pixel side that are covered with solidified electrolyte 305. On the control side, the PEDOT:PSS layer 309 is formed of a continuous layer, which also is patterned and delimited by means of subtractive methods. An electrode line 330 and electrode extension 331 is provided for facilitating the application of a potential to the PEDOT:PSS layer 309 and the electronic conductor 307. The electronic conductor 307 may, however, also be provided with a potential applied to, or via, the PEDOT:PSS layer, without the use of electrodes 330, 331. The PEDOT:PSS layer 309 on the control side surface is provided with a separating layer 313 of isolating material having an open channel, or portion. The separating layer is in this embodiment arranged to cover the full extension of the pixel device including the electrode line 330 and electrode extension 331, and the separating layer may also form a common separating structure for a plurality of pixel devices.

With reference to FIG. 3d, a schematic cross-sectional view of an embodiment of a bottom unit of the pixel device is shown. The bottom layer of the pixel device comprises a substrate 361 which on an upper surface is arranged with a PEDOT:PSS layer 311 that may be bar coated onto the substrate. The PEDOT:PSS layer is arranged with two separating lines 322 which, for example, is formed by cutting, etching or bleaching the PEDOT:PSS layer. The separating lines separate the PEDOT:PSS layer from similar layers of neighbouring pixel devices and defines the extension of one pixel device on the bottom unit. The PEDOT:PSS layer is arranged or covered with a layer of solidified electrolyte 310, that is positioned so as to conform with the solidified electrolyte 310 in the open channel, or portion, of the separating layer of the middle unit, shown in FIGS. 3b and 3c, when the bottom unit is arranged in abutment with the middle unit. In addition, the bottom layer may be arranged with an electrode 323 which allows a voltage to be applied to the PEDOT:PSS layer. The electrode is formed of a conducting material arranged in a line.

Generally, the pixel device may be manufactured by printing on the insulating layer, or the pixel device may be printed in a sequential order starting with the e.g. any of layers of the pixel or control element. The pixel device may also be manufactured by arranging the pixel element and control element on the insulating layer, wherein, in a pre-manufacturing step, the pixel element and control element are prepared as separate units. After the units have been prepared, they are arranged on a respective side of the insulating layer.

Figure 4:
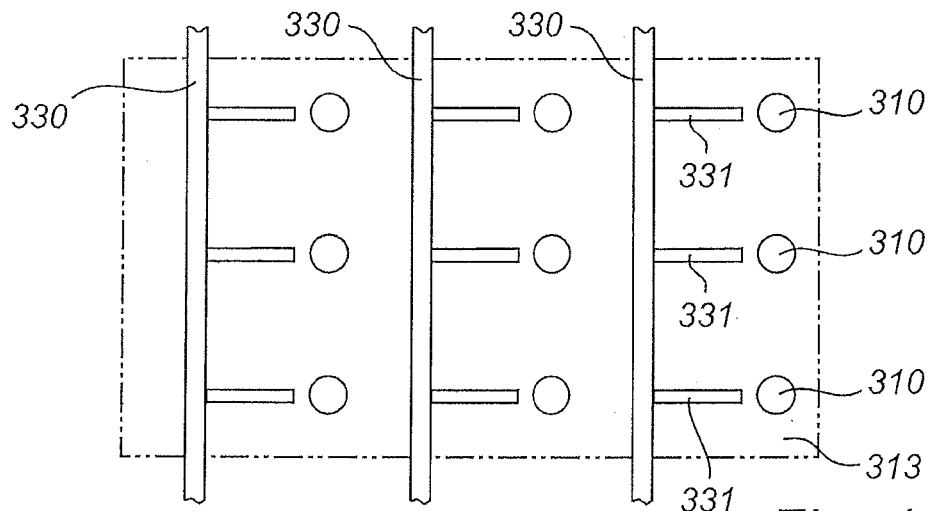
FIG. 4 is a schematic cross-sectional view along line III-III in FIG. 3c.
Figure 5:
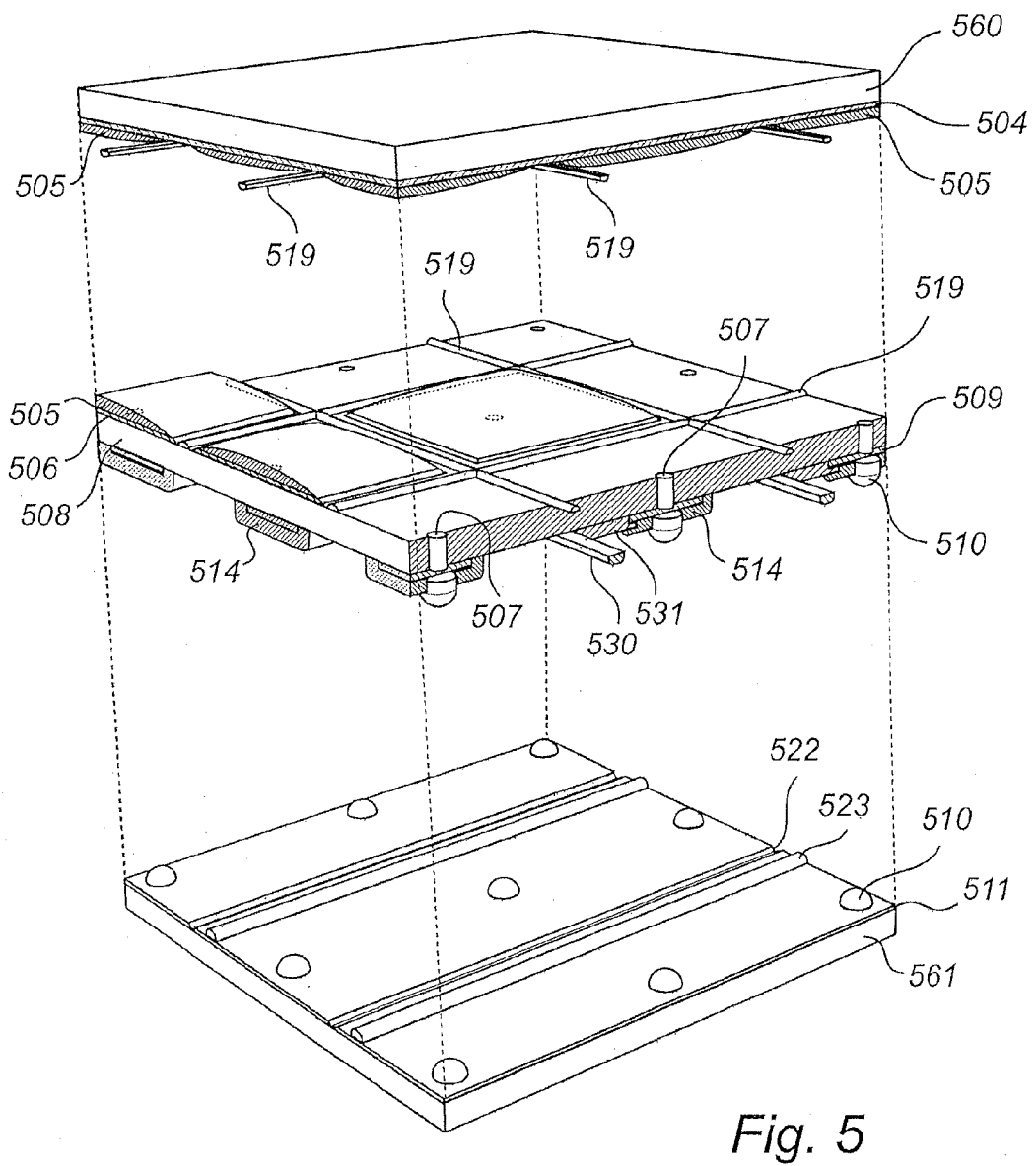
FIG. 5 is schematic perspective and exploded view of an embodiment of the pixel device.

FIG. 4 illustrates a schematic plan view, taken at III-III in FIG. 3c, of a plurality of pixel devices arranged in a matrix configuration. The electrode line 330 is provided in order to allow for a column wise potential to be applied to the control element of each pixel device. The electrode line 330 may be formed of a suitable conducting material and is provided with a plurality of carbon electrode extension 331, one for each pixel device. The carbon electrode extension facilitates the application of a potential to the electrochemically active area of the control element of each pixel device, and the electrode extension reaches from the electrode line towards the third electrolyte control layer 310. The third control layer 310 is properly arranged on the first control layer, not shown, and delimited by the surrounding separating material 313. FIG. 5 is a schematic exploded view of a portion of a display arrangement of a plurality of pixel devices, and is for illustrative purposes separated into three different units: a top unit, middle unit, and a bottom unit, as described earlier with respect to FIG. 3a, FIG. 3b, and FIG. 3d.

The top unit is formed of an uniformly coated PEDOT:PSS layer 504 which is applied on a pixel side of a substrate or carrier 560. In order to achieve a pixel patterning, the PEDOT:PSS layer 504 is patterned with a grid arrangement of a low surface energy material 519, such as polytetrafluoroethylene, which may be used to define a pixel portion area of each pixel device. An electrolyte layer 505 is arranged on the PEDOT:PSS layer 504 in each defined pixel portion area, wherein the low surface energy material 519 may be used to separate the electrolyte layer 505 into each pixel portion area.

The middle unit comprises the insulating layer 508 having passages which are holding an electronic conductor 507. On a pixel side, the insulating layer 508 is patterned with a low surface energy material, such as polytetrafluoroethylene, in a grid arrangement in order to define each pixel device area. Each pixel device area is printed with a PEDOT:PSS layer 506 and an electrolyte layer 505. The electrolyte layer 505 of the middle unit is arranged to conform with the electrolyte layer 505 of the top layer, so as to form one electrolyte layer in each pixel. The electrolyte layers of the respective pixels in the matrix are ionically isolated from each other. The PEDOT:PSS layer 506 is arranged in electronic contact with the electronic conductor 507 which allows for control of the pixel element of the pixel device. As a remark, some of the PEDOT:PSS layer 506 portions and electrolyte layer 505 portions of the middle unit are for illustrative purposes omitted in FIG. 5.

On a control element side of the insulating layer 508, each electronic conductor is in contact with a separate PEDOT:PSS layer 509 which is printed in separate patterned portions, wherein each portion covers the corresponding electronic conductors 507. The control side of the insulating layer is further provided with column wise arranged electrode lines 530, such as silver electrode lines, for facilitating the application of a potential to the PEDOT:PSS layer 509 and matrix addressing of each pixel device. For each pixel device, the electrode line 530 is in electronic contact with an electrode extension 531 formed of carbon, which extends in a direction towards the electronic conductor 507. The electrode extension 531 is utilized for facilitating the application of a potential to the PEDOT:PSS layer 509 in a region close to the electronic conductor 507. The PEDOT:PSS layer is further provided with a lacquer or isolating material 514, which is arranged on the PEDOT:PSS layer 509 and provided with an opening, or channel. The opening or channel encloses an electrolyte 510, wherein the opening or channel of the isolating material 514 defines the contact area between the PEDOT:PSS layer 509 and the electrolyte 510. Furthermore, the isolating material may be used to facilitate isolation between e.g. the electrodes and electrolyte.

The bottom unit comprises a substrate or carrier 561 with a uniformly coated PEDOT:PSS layer 511 that is patterned, by e.g. etching, into a row arrangement, wherein patterned lines 522 are separating each row of the PEDOT:PSS layer 511. The PEDOT:PSS layer 511 is provided with a row arrangement of electrode lines 523 for facilitating the application of a potential difference and matrix addressing of each pixel device. Further, drops of electrolyte 510 are provided on the bottom layer at positions corresponding to positions of the electrolyte 510 on the control side of the insulating layer.

With reference to FIG. 5, in the finished product, the top, middle and bottom unit, will be arranged to form one unit. This means, for example, that the electrolyte layer 505 of the top and middle unit, and the electrolyte layer 510 of the middle and bottom unit is merged into one electrolyte layer 505 and one electrolyte layer 510, respectively. In the finished product, cross-talk between different electrodes during matrix addressing of pixel devices is preferably minimized. For example, the column electrode lines 530 and the row electrode lines 523 are isolated from each other by means of an isolating coating or film. Alternatively, the row electrode lines and column electrode lines are isolated only at each intersection between row and columns electrode lines.

For illustrative purposes, the pixel device according to the present invention may be described as an electrochromic element controlled by a transistor type device based on electrochemical active material. Portions of the first control layer forms a transistor channel having the ability of electrochemically changing its electronic conductivity. The transistor channel is mainly defined by the volume of electrochemically active material which surface is in contact with said electrolyte. Please note, however, that some of the electrochemical reaction controlling the electronic conductivity may occur also slightly outside the above defined volume. The transistor channel is associated with a source, drain and gate electrode, wherein the gate electrode allows for conductivity control of the transistor channel. In an embodiment, the gate electrode corresponds to the second control layer 311. The source and drain electrode corresponds to the first control layer 309 in combination with the electronic conductor 307 in the passage 312, or vice versa. Which of the first control layer and the electronic conductor is source and drain, respectively, is determined by the polarity of the applied voltage.

Figure 6:
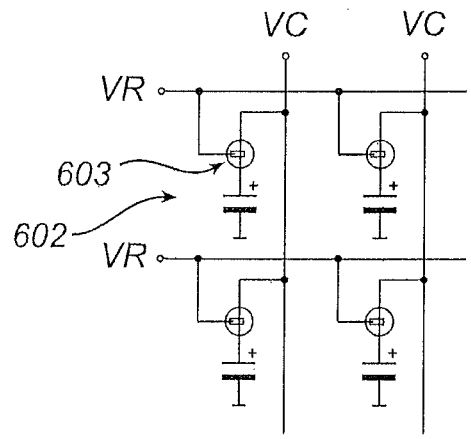
FIG. 6 is a schematic view of an embodiment of a matrix circuit diagram for the pixel device.
Figure 7:
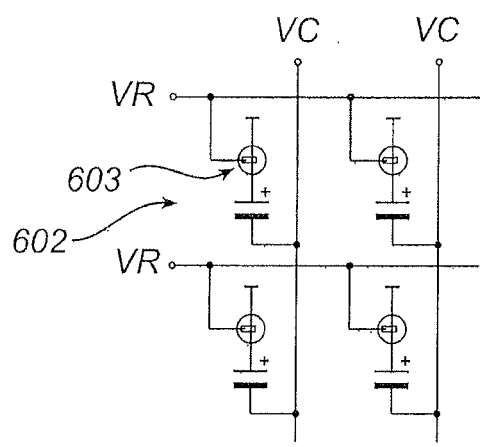
FIG. 7 is a schematic view of an embodiment of a matrix circuit diagram for the pixel device.

In order to provide an updateable display device of a matrix of pixel elements according to the present invention, each pixel element may be coupled according to various matrix circuit diagrams, for example as illustrated in FIG. 6 and FIG. 7. Each example of circuit diagrams may allow for an update of the display based on active addressing. In the embodiments described below, the potentials are applied such that the source corresponds to the first control layer and the drain corresponds to the electronic conductor in said passage.

In an embodiment, referring to the diagram scheme in FIG. 6, a display device circuit diagram comprising a 2×2 active matrix display arrangement has an electrochromic element 602 that is controlled by an electrochemical transistor 603. The top pixel layers of all the pixel devices are commonly connected to a common potential $V_0$ e.g. ground, thus, kept at a constant potential. A row line VR connects all the transistor gate electrodes in the same row, and a column line VC connects the source electrodes of all transistors in the same column. In this embodiment, during operation, non-addressed row lines are kept at a first potential $V_1 > V_0$ of e.g. at least 3V which is larger than said common potential, while an addressed row line is put to a second potential $V_2$ ($V_0 < V_2 < V_1$) of e.g. 2V, wherein said first potential is larger than both said second and said common potential. In other words, column lines that are put to said second potential $V_2$ will initiate a colour change of the selected pixel device in the addressed row.

In an embodiment with alternative circuit design, referring to the diagram scheme in FIG. 7, the source electrodes of the all the transistors are connected to $V_0$ e.g. ground, thus, kept at a constant potential. A row line VR connects all transistor gate electrodes in the same row, and a column line VC connects the top pixel layers 304. During operation, in order to address and update a pixel device, the row lines that are not to be updated are kept at $V_1 > V_0$, e.g. a positive potential of 3 V, while the row line to be addressed is provided the potential $V_0$. Furthermore, column lines that are put to a potential $V_2$, ($V_2 < V_0$) e.g. negative potential of −2V, will charge and change the colour of the pixel device placed in the intersection of the column and row lines.

Decolouring of the pixel devices may be achieved by control of the relative potentials that are applied during operation of each pixel device through matrix addressing, as described above. In more detail, decolouring, or discharge, of the pixel device may be achieved by first addressing a pixel device and applying a zero potential, or reversing the potential difference applied to the electrochromic element of that pixel device. Furthermore, reversing the polarity of the described electrochemical transistor of a pixel device, such that the transistor redefines its source and drain electrodes, may be used for decolouring. For example, with reference to the circuit design diagram in FIG. 7, a coloured pixel device may be decoloured by applying a potential of 0 V to the corresponding column line.

Above voltage magnitudes are just examples, other may be used as long as the same effect is achieved. As described above, active addressing may be described as simultaneously having addressed and non-addressed pixel devices. Active addressing may also be described as having the transistor channel set to an open or closed state, wherein an addressed pixel device corresponds to an open state of the transistor channel, and a non-addressed pixel device corresponds to a closed state of the transistor channel, or vice versa.

In an embodiment of the present invention, with reference to FIG. 3a-d, the patterning of the first and second pixel layers and first and second control layers is arranged to allow for pixel device operation and matrix addressing based on the diagram scheme illustrated in FIG. 6. Optionally, the first and second pixel layers and the first and second control layers may instead be patterned and delimited in rows and column arrangements such that matrix addressing corresponding to the diagram scheme illustrated in FIG. 7 may be used during pixel device operation. For example, the top pixel layer may be patterned in columns and the first control layer connected to a common reference potential or ground. Alternative column or row design patterns of the pixel and control layers of pixel devices in a display arrangement are also contemplated.

Figure 8:
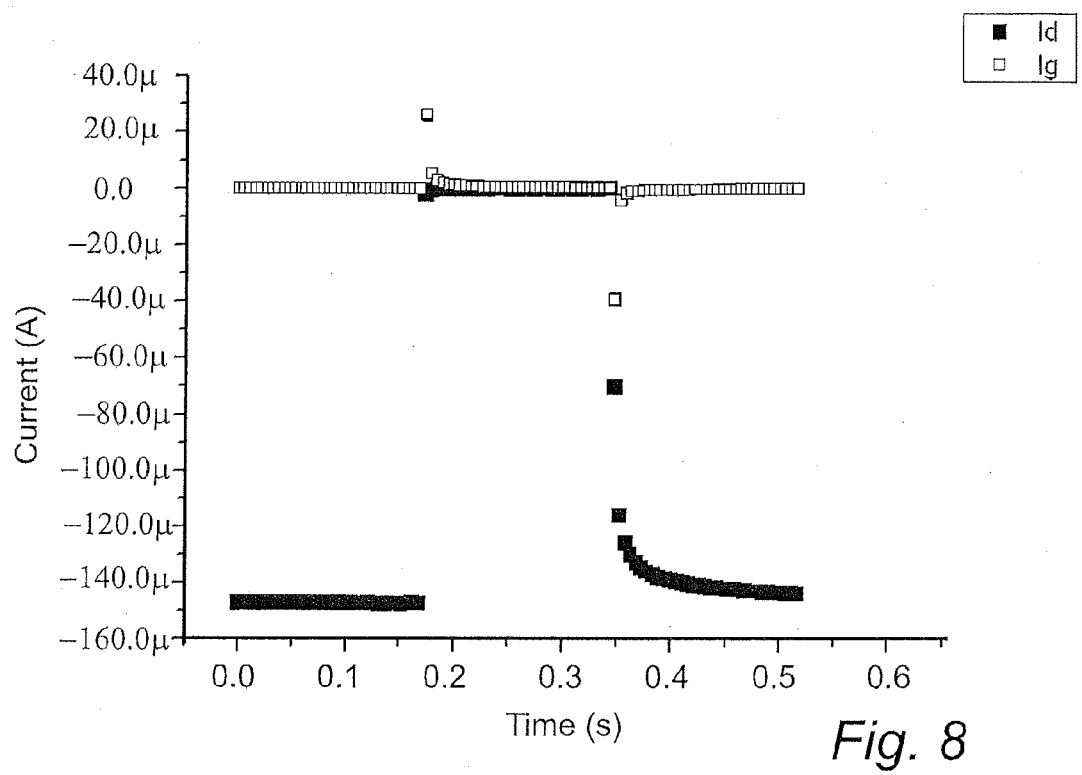
FIG. 8 is a diagram, which presents results from measurements made on the control element of the pixel device.

FIG. 8 presents results from test measurements made on the control element of the pixel device. During the test measurements, the on and off switching characteristics of the control element, in the following referred to with transistor notations, were tested and measured. Below, similar features as illustrated in FIG. 1 are denoted with the same reference numbers as used in FIG. 1.

An insulating layer 108, being a 50 µm thick PET-foil (Melinex 454 manufactured by DuPont Teijin films) was provided, in which a passage 112 had been created by laser irradiation. The entrance diameter of the passage was ~30 µm on a first side of the insulating layer 108, and ~70 µm on the other side of the layer 108. An electronic conductor 107 of carbon paste (7102 conductor paste manufactured by DuPont) was deposited into the passage by forcing the carbon paste into said passages using a squeegee. The carbon paste was dried at 110° C. for five minutes.

A control element 103 was realized by bar coating, on said first side of said insulating layer 108, a first control layer 109 being a 1 µm thick layer of PEDOT:PSS (ICP-1010, provided by AGFA Gevaert, slightly modified by dilution), arranged such that the first control layer 109 covers the electronic conductor 107.

A printed lacquer layer, encircling an area of 1 mm$^2$, was thereafter arranged on said first control layer; and a third control layer or control electrolyte layer 110 was arranged within said printed lacquer layer, such that the third control layer 110 was confined to an area of 1 mm$^2$. The third control layer 110 typically consists of a solidified electrolyte or an ionic liquid. One example of a suitable solidified electrolyte is a blend consisting of 40 wt.-% deionized water, 40 wt.-% PSS (poly(styrene sulfonic acid)), 10 wt.-% sorbitol and 10 wt.-% glycerol. The solidification of the electrolyte can be achieved by evaporating some of the water content at, for example, 50° C. The second control layer 111, or the gate electrode, was laminated partially onto the third control layer 110 and partially onto said first control layer; and consisted of a ~200 nm thick layer of PEDOT:PSS (Orgacon EL-350 provided by AGFA Gevaert). In more detail, the second control layer is laminated such that it covers the whole of said third control layer and a portion of said first control layer. Further, the second control layer is in direct contact with said third control layer, but not in direct electronic contact with said first control layer. Optionally, a further electrolyte layer or third control layer, confined by a lacquer layer arranged on said second control layer, can be deposited on top of said second control layer 111 before the lamination, in order to ensure ionic contact between the first control layer 109 and the second control layer 111. In other words, said first control layer 109 is laminated on said second control layer 111 in such a way that the electrolyte control layers 110, provided on said first and second control layer, respectively, are integrated with each other and do not extend outside the lacquer layers.

In order to facilitate the application of a potential to the electronic conductor during the test measurements an electrode having a larger area than the electronic conductor was provided, by arranging a drop of carbon paste on said electronic conductor such that the center of the drop covered the passage opening on the second side of said substrate and such that the carbon paste was in electronic contact with said electronic conductor. This extra carbon layer is referred to as drain electrode below in analogy with the transistor annotation. The step of providing an enlarged contact portion of carbon paste may be omitted when producing the complete electrochromic pixel.

The pixel element 102 was omitted in the experiment set-up, and the measurements were performed on the control element of the pixel device.

During the measurement, the first control layer or the source contact or the source electrode 109, receives a source potential Vs which is kept at a constant zero potential, Vs=0V. The drain electrode, receives a drain potential Vd, which is kept at a constant negative potential, Vd=−1V. The second control layer 111, or the gate contact layer, receives a gate potential Vg. The switching of the control element between a conducting and a non-conducting state is achieved by switching the potential applied to the gate contact, Vg, between 0V and 1V. Switching Vg from 0V to 1V turns the transistor to its off-state, i.e. the current between the source electrode 109 and drain electrode is turned off, and switching Vg back to 0V turns the transistor to its on-state. In the experiment, the transistor is initially kept in its on-state, Vg=0V, thereafter it is switched to its off-state by applying a potential of Vg=1V after a little more than 0.15 s, and finally it is switched back to its initial on-state, Vg=0V, after about 0.35 s. FIG. 8 depicts the measurement of the drain electrode current, Id, as well as the gate electrode current, Ig. As is shown in FIG. 8, the experiment results in a negative Id current during the transistor's on-state, since the transistor is arranged to operate in the third quadrant, that is, the drain potential Vd is negative as compared to the source potential Vs. The Ig current is in FIG. 8 indicative of the switching of Vg between 0V and 1V. As can be seen each switching event results in a charging/discharging current peak due to the electrochemical reaction between the second control layer 111 and the first control layer 109.

Figure 9:
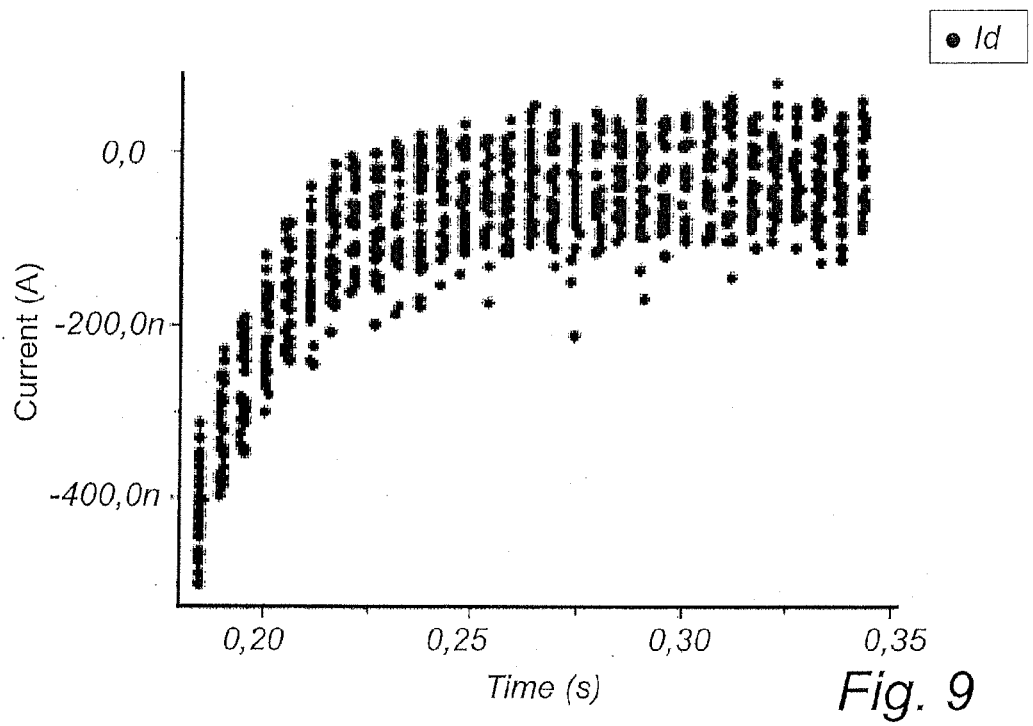
FIG. 9 is a cut-out of a portion of the diagram shown in FIG. 8.

FIG. 9 is a zoom-in view of the results from the experiment described in relation to FIG. 8. The zoom-in view indicates the change of the Id current when the transistor is switched from its on-state to its off-state. As illustrated, the Id current rapidly changes towards zero when the transistor is turned to its off-state. An on/off-ratio exceeding three orders of magnitudes is achieved by comparing the on-current level in FIG. 8 with the off-current level in FIG. 9.

Figure 10:
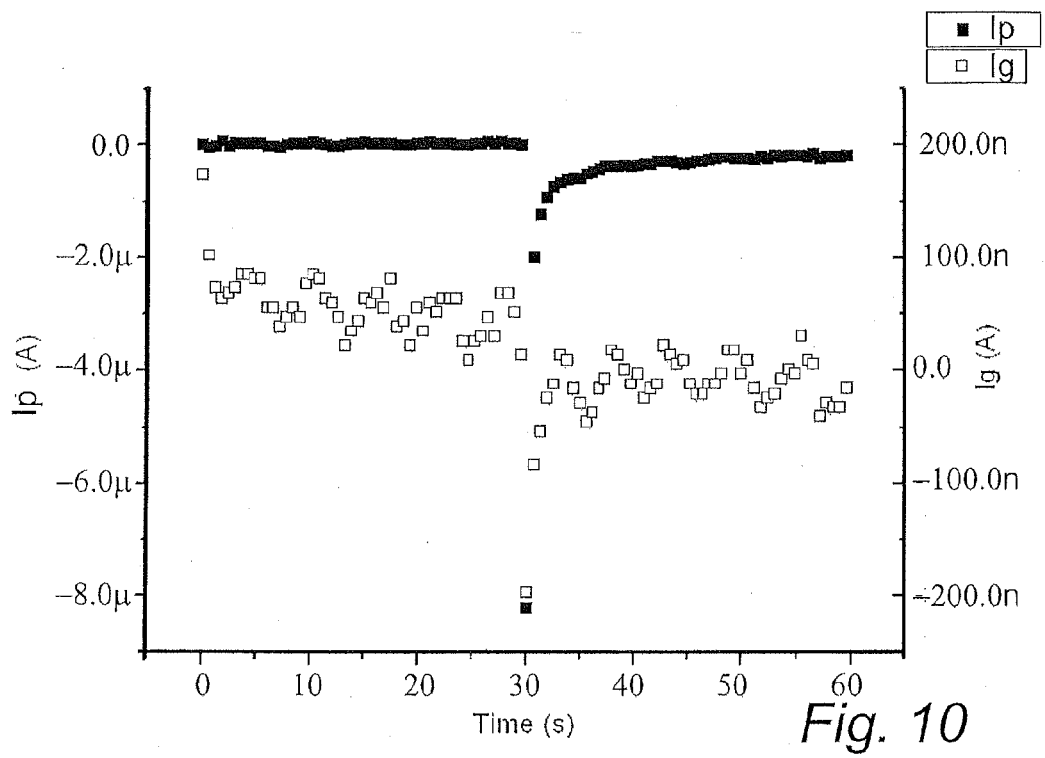
FIG. 10 is a diagram, which presents results from measurements of a switch-test made on a pixel device, i.e. when the pixel switches from a non-colored state to a colored state.

FIG. 10 presents results from test measurements performed on one embodiment of the electrochromic pixel device. The measurement is designed as a switch test of the pixel device, wherein the pixel device is switched from a non-colored state to a colored state. In analogy with the measurement described in relation to FIG. 8, the transistor terminology, such as source and gate contacts, is used also for this set-up, and the layers are referred to with reference to FIG. 1.

The electrochromic pixel device was produced by first providing an insulating layer 108 comprising an electronic conductor, whereon a first control element was arranged as described in relation to FIG. 8. Further, the second pixel layer 106 of the pixel device was realized by bar coating of a ~1 µm thick layer of PEDOT:PSS (ICP-1010 provided by AGFA Gevaert) on the second side of said insulating layer 108 on top of said drain electrode. Screen and inkjet printing are other examples of deposition methods available for the creation of pixel layer 106. The third pixel layer, or electrolyte pixel layer 105, was arranged on said second pixel layer, as described in relation to the third control layer shown FIG. 8, with the exception that $TiO_2$ particles were also immersed in the electrolyte to make it white and opaque, before it was applied to the second pixel layer. The third pixel layer was confined to an area of ~1 $mm^2$ by use of a printed lacquer layer within which the third pixel layer was arranged, which technique was described in more detail in relation to FIG. 8. Further, a first pixel layer 104, consisting of a ~200 nm thick layer of PEDOT:PSS (Orgacon EL-350 provided by AGFA Gevaert), was laminated onto the third pixel layer 105. Optionally, a further electrolyte layer or third pixel layer, confined by a lacquer layer, can be deposited on top of said first pixel layer 104 before the lamination, in order to ensure ionic contact between the first pixel layer 104 and the second pixel layer 106. In other words, said first pixel layer 104 is laminated on said second pixel layer 106 in such a way that the electrolytes 105, provided on said first and second pixel layer, respectively, are integrated with each other and do not extend outside the lacquer layer.

In the measurement set-up, the first control layer or source contact 109, receives a source potential Vs and is kept at a constant zero potential, Vs=0V. The first pixel layer or pixel contact 104, receives a pixel potential Vp, which is kept at a constant negative potential, Vp=−1V. The second control layer or gate contact 111, receives a gate potential Vg. Initially, as illustrated in FIG. 10, the control element is in an off-state by that Vg is kept at 1V. After about 30 seconds, a 0V potential is applied to Vg resulting in a switching of the control element, which, in turn, allows for a current, Ip, to pass through the control element and the pixel element, i.e. between the first control layer 109 and the first pixel layer 104. Thus, the pixel element is colored, or updated, due to an electrochemical reaction in the pixel element. As illustrated in FIG. 10, the Ip current formation, which is read on the left axis, is indicative of how the pixel device is updated during a short period in time which continues until the electrochromic pixel element is fully reacted, or charged. The measurement proves that the applied potential on the gate electrode controls the color state of the pixel element, wherein the gate current Ig is read on the right axis of FIG. 10.

Figure 11:
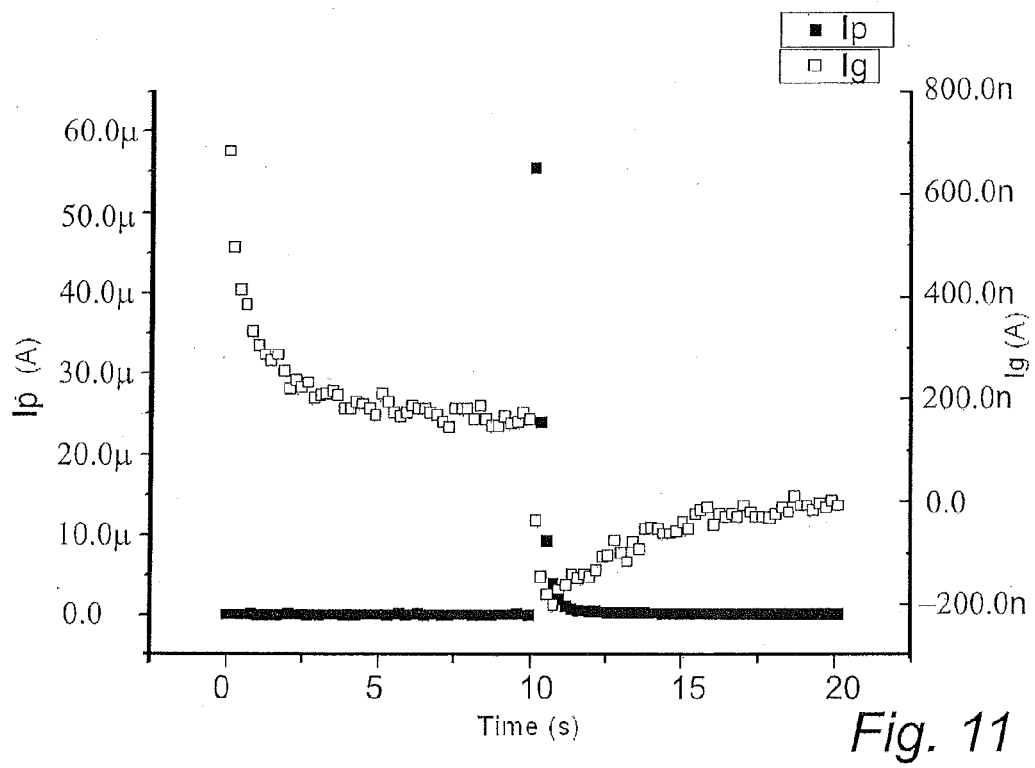
FIG. 11 is a diagram, which presents results from measurements made on a pixel device, wherein the pixel is switched from a colored state to a non-colored state.

FIG. 11 presents results from test measurements performed on an electrochromic pixel device, arranged as described in relation to FIG. 10. During this measurement the pixel device is switched from a colored state to a non-colored state. In other words, the stored charges of a colored first pixel layer are released which leads to de-coloring of the pixel device. During the testing, the first pixel layer is initially charged, or colored, and Vp as well as Vs is constantly kept at a zero potential, Vp=0V, Vs=0V. Initially, Vg is kept at a positive potential, Vg=2V, which indicate that the control element is in its off-state. Hence, a color change of the pixel element is prevented. After about 10 seconds, Vg is set to a zero potential, Vg=0V, and the control element is switched to its on-state. The Ip current formation in FIG. 11, which is read on the left axis, is indicative of how the pixel element of the pixel device during a limited time period undergoes a discharge, or de-coloring, process. The measurement proves that the control element is capable of storing charges inside a colored pixel element. The gate current Ig is read on the right axis in FIG. 11.

Figure 12:
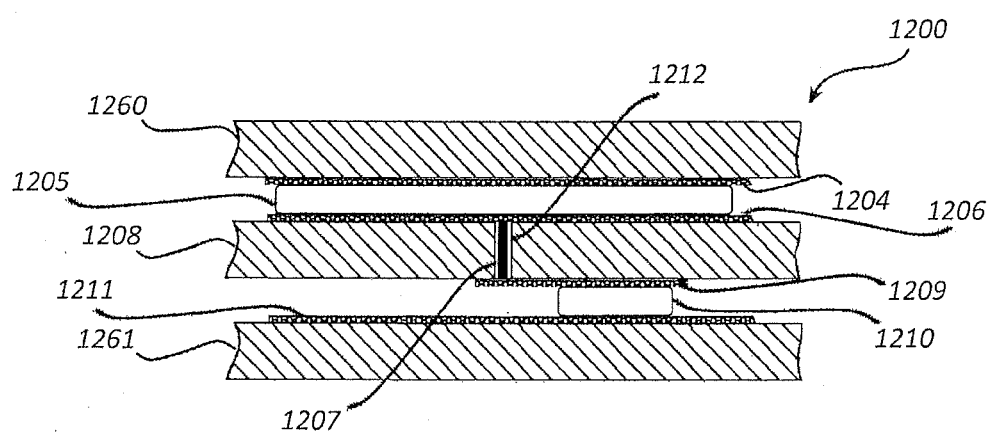
FIG. 12 is a schematic cross-sectional view of an embodiment of the pixel device, wherein the third layer of the control element is arranged to the side of the passage in the insulating layer.

FIG. 12 is a schematic cross-sectional view of one embodiment of an electrochromic pixel device. The electrochromic pixel device is arranged as described in relation to FIG. 1, except that the third control layer 1210 is arranged to the side of the passage 1212 in the insulating layer 1208 as seen along a viewing direction normal to said first pixel layer. In other words, the electrochromic pixel device comprises: a first pixel layer 1204 arranged on a substrate, which first pixel layer is at least partially covered by a third pixel layer, or an electrolyte pixel layer, 1205. A second pixel layer 1206 is ionically connected to said first pixel layer 1204 by said third pixel layer 1205. Further, there is provided an insulating layer 1208 comprising a passage 1212, wherein an electronic conductor 1207 is arranged. The electronic conductor is in electronic contact with said second pixel layer 1206 and a first control layer 1209, such that an electronic connection is provided between said second pixel layer 1206 and a first control layer 1209. In other words, said second pixel layer 1206 is arranged on an opposite side of said isolating layer 108 compared to said first control layer 1209, i.e. said second pixel layer 1206 and a first control layer 1209 is each arranged on a respective side of said insulating layer 1208. Further, said first control layer 1209 is at least partially covered by a third control layer, or an electrolyte control layer, 1210. A second control layer 1211 is ionically connected to said first control layer 1209 by said third control layer 1210. In more detail, said third control layer is arranged to the side of the passage 1212 in said insulating layer along a direction coinciding with the direction of extension of said electronic conductor. In other words, said third control layer 1210 is not arranged in front of, but to the side of, the most adjacent opening of said passage. Furthermore, said first control layer extends from said electronic conductor 1207 to and across said third control layer, such that an electronic connection is provided between said third control layer and said electronic conductor.

In the above description, the invention has mainly been described with reference to a number of explicitly disclosed embodiments. However, as is readily appreciated by a person skilled in the art, embodiments other than the ones disclosed above are equally possible within the scope of the invention, as defined by the appended patent claims. For example, electrochemically active and electrochromic layers of the embodiment in FIG. 5 is described as being formed of PEDOT:PSS. However, other electrochemically active and/or electrochromic layers than those being formed of PEDOT:PSS may be used and fall within the scope of this invention. Additionally, magnitudes of the applied potentials other than the ones disclosed above are equally possible within the scope of the invention.

The invention claimed is:

1. A method for manufacturing a flexible display arrangement including electrochromic pixel devices arranged in a matrix, said method comprising
   providing a continuous and flexible insulating layer comprising plastic, the insulating layer forming a carrier for said display arrangement, wherein the thickness of the insulating layer is at least 10 µm and at most 200 µm, and thereafter
   providing a passage in said insulating layer, wherein the method further comprises in optional order:
   providing an electrical conductor in said passage;
   providing a first control layer to a first side of said insulating layer,
   providing an electrolyte control layer of solidified electrolyte in ionic contact with said first control layer,
   providing a first pixel layer to a second side of said insulating layer,
   providing an electrolyte pixel layer of solidified electrolyte in ionic contact with said first pixel layer;
   arranging a second control layer in ionic contact with said electrolyte control layer,
   wherein one of said first and second control layers is electronically conducting and electrochemically active and the other is arranged of an electrochemically active organic material, which material has the ability of electrochemically altering its electronic conductivity through change of redox state thereof;
   arranging a second pixel layer in ionic contact with said electrolyte pixel layer,
   wherein one of said first and second pixel layers is electronically conducting and electrochemically active and the other pixel layer is arranged of an electrochromic and electrochemically active organic material; and
   such that said electronic conductor in said passage is in electronic contact with said first control layer and first pixel layer, and
   said continuous insulating layer forms an insulating layer of each one of said pixel devices.

2. A method according to claim 1, wherein said step of providing a passage in said insulating layer, is performed by way of laser techniques.

3. A method according to claim 1, wherein said method for manufacturing a flexible display arrangement is a method for manufacturing a printable display arrangement and
   said steps of providing an electrical conductor, providing a first control layer and providing a first pixel layer are performed by way of printing techniques.

4. A method according to claim 3, wherein said steps of providing an electrolyte control layer and an electrolyte pixel layer are performed by way of printing techniques.

5. A method according to claim 1, wherein said steps of arranging a second control layer in ionic contact with said electrolyte control layer and arranging a second pixel layer in ionic contact with said electrolyte pixel layer are performed by way of a lamination process.

6. A method according to claim 1, wherein said carrier is self-supporting.

7. A flexible display arrangement including a plurality of electrochromic pixel devices arranged in a matrix, each pixel device comprising:
   a pixel element comprising:
   a first pixel layer arranged of an electrochromic and electrochemically active organic material,
   a second pixel layer facing said first pixel layer and being arranged of electrically conductive and electrochemically active material,
   a third pixel layer arranged of a solidified electrolyte which is arranged spatially between, and in ionic contact with, said first and second pixel layer,
   a control element comprising:
   a first control layer arranged of an electrochemically active organic material which has the ability of electrochemically altering its electronic conductivity through change of redox state thereof,
   a second control layer of electrically conducting and electrochemically active material,
   a third control layer of a solidified electrolyte which is arranged spatially between, and in ionic contact with, said first and second control layers, wherein said control element along a viewing direction normal to said first pixel layer is arranged behind said first pixel layer;

an insulating layer arranged between said pixel element and said control element, which insulating layer comprises a passage, and an electronic conductor arranged in said passage, wherein said electronic conductor is in electronic contact with that of said first or second pixel layer which is most adjacent said insulating layer, and in electronic contact with said first control layer, wherein said display arrangement comprises a continuous and flexible layer of insulating material comprising plastic, which layer has a thickness of at least 10 µm and at most 200 µm, wherein the continuous and flexible layer forms said insulating layer of each of said plurality of electrochromic pixel devices.

8. A display arrangement according to claim 7, wherein said continuous layer of insulating material is self-supporting.

9. A display arrangement according to claim 7 wherein the thickness of said continuous layer of insulating material is at least 20 µm.

10. A display arrangement according to claim 7, wherein the thickness of said continuous layer of insulating material is at least 50 µm.

11. A display arrangement according to claim 7, wherein the thickness of said continuous layer of insulating material is at most 150 µm.

12. A display arrangement according to claim 7, wherein the thickness of said continuous layer of insulating material is at most 100 µm.

13. A display arrangement according to claim 7, in which the layers of said pixel element and said control element are arranged substantially in parallel.

14. A display arrangement according to claim 7, in which said passage, in a viewing direction normal to said first control layer, is arranged in front of said first control layer.

15. A display arrangement according to claim 7, wherein the surface of said first control layer and the surface of said second control layer, each being in ionic contact with said third control layer, are facing the same direction.

16. A display arrangement according to claim 7, wherein at least a portion of said first control layer is facing said second control layer.

17. A display arrangement according to claim 7, in which said passage has a cross-sectional area between 10 µm$^2$ and 2 mm$^2$.

18. A display arrangement according to claim 7, in which the cross-sectional area of said third pixel layer is at least 5 times larger than the cross-sectional area of said third control layer.

19. A display arrangement according to claim 7, in which the cross-sectional area of said second pixel layer is at least 5 times larger than the cross-sectional area of said third control layer.

20. A display arrangement according to claim 7, in which the cross-sectional area of said third control layer is equal to or larger than the opening area of said passage adjacent to said third control layer.

21. A display arrangement according to claim 7, wherein said electronic conductor is arranged of a material arrangeable in said passage by way of printing.

22. A display arrangement according to claim 7, wherein said electronically conductive material is selected form a group comprising: electronically conductive polymers, carbon, inert metals, and combinations thereof.

23. A display arrangement according to claim 7, wherein the thickness of said first control layer is between 0.01-0.5 µm.

24. A display arrangement according to claim 7, in which said insulating layer is formed of a plastic film.

25. A display arrangement according to claim 7, in which said insulating layer is formed of a polyester foil.

26. A display arrangement according to claim 7, wherein at least one of said first pixel layer, second pixel layer, first control layer, and second control layer is formed of an electrically conducting polymer.

27. A display arrangement according to claim 7, comprising an isolating layer arranged between said first control layer and said second control layer, said isolating layer having an open portion that is defining the contact area between said first control layer and said third control layer.

28. A display arrangement according to claim 7, comprising a continuous layer of electronically conductive material forming one of said pixel layers of each of said plurality of electrochromic pixel devices.

29. A display arrangement according to claim 7, wherein said display arrangement is actively addressed.

30. A display arrangement according to claim 7, wherein the thickness of said first control layer is between 0.1 µm and 7 µm.

31. A display arrangement according to claim 7, wherein all of said first pixel layer, second pixel layer, first control layer, and second control layer are formed of an electrically conducting polymer.

* * * * *